United States Patent
Panagotopulos (10) Patent No.: US 10,948,110 B2
(45) Date of Patent: Mar. 16, 2021

(54) MULTI-PIECE FLOW THROUGH CONNECTOR

(71) Applicant: Dynisco Instruments LLC, Franklin, MA (US)

(72) Inventor: Louis Panagotopulos, Walpole, MA (US)

(73) Assignee: Dynisco Instruments LLC, Franklin, MA (US)

( * ) Notice: Subject to any disclaimer, the term of this patent is extended or adjusted under 35 U.S.C. 154(b) by 444 days.

(21) Appl. No.: 15/838,197

(22) Filed: Dec. 11, 2017

(65) Prior Publication Data

US 2018/0163903 A1 Jun. 14, 2018

Related U.S. Application Data

(60) Provisional application No. 62/433,663, filed on Dec. 13, 2016.

(51) Int. Cl.

| | |
|---|---|
| *F16L 37/12* | (2006.01) |
| *F16L 15/04* | (2006.01) |
| *F16L 13/14* | (2006.01) |
| *G01L 7/02* | (2006.01) |
| *F16L 19/02* | (2006.01) |
| *G01N 30/22* | (2006.01) |

(Continued)

(52) U.S. Cl.
CPC ............ *F16L 15/04* (2013.01); *F16L 13/141* (2013.01); *F16L 19/0206* (2013.01); *F16L 25/0072* (2013.01); *F16L 49/06* (2013.01); *G01L 7/02* (2013.01); *G01L 9/0026* (2013.01); *G01L 19/0023* (2013.01); *G01N 30/22* (2013.01); *G01N 30/60* (2013.01); *F17D 3/10* (2013.01); *G01N 30/6039* (2013.01)

(58) Field of Classification Search
CPC . F16L 21/08; F16L 21/06; F16L 37/00; F16L 37/08; F16L 37/12; F16L 37/1225; F16L 2101/30
See application file for complete search history.

(56) References Cited

U.S. PATENT DOCUMENTS

| | | | |
|---|---|---|---|
| 3,881,753 A | 5/1975 | Bochory | |
| 4,741,590 A | 5/1988 | Caron | |

(Continued)

FOREIGN PATENT DOCUMENTS

| | | |
|---|---|---|
| JP | H01-172708 | 7/1989 |
| JP | H08-240453 | 9/1996 |

OTHER PUBLICATIONS

International Search Report and Written Opinion for International Application No. PCT/US2017/065602, dated Feb. 22, 2018.

(Continued)

*Primary Examiner* — Aaron M Dunwoody
(74) *Attorney, Agent, or Firm* — Fish & Richardson P.C.

(57) ABSTRACT

Flow through connectors and pressure sensing devices as well as their methods of use are described. In some instances a pressuring sensing device may include a ceramic body with a flow path extending through the ceramic body and at least one non-ceramic body attached to the ceramic body. The at least one non-ceramic body may include one or more attachment features formed therein and the flow path extends through the at least one non-ceramic body as well.

7 Claims, 4 Drawing Sheets

(51) Int. Cl.
*G01L 19/00* (2006.01)
*G01L 9/00* (2006.01)
*F16L 25/00* (2006.01)
*F16L 49/06* (2006.01)
*G01N 30/60* (2006.01)
*F17D 3/10* (2006.01)

(56) References Cited

U.S. PATENT DOCUMENTS

| | | | |
|---|---|---|---|
| 4,836,305 A * | 6/1989 | Curlett | E21B 21/08 175/215 |
| 5,540,464 A | 7/1996 | Picha | |
| 5,756,900 A | 5/1998 | Arie et al. | |
| 6,171,253 B1 | 1/2001 | Bullister et al. | |
| 7,648,177 B2 * | 1/2010 | Tombler, Jr. | F16L 17/10 285/96 |
| 2005/0067831 A1 * | 3/2005 | Tokairin | B21D 39/04 285/3 |
| 2006/0060515 A1 | 5/2006 | Benevides et al. | |
| 2007/0247329 A1 * | 10/2007 | Petrovic | E21B 47/24 340/854.4 |
| 2011/0023472 A1 * | 2/2011 | Saito | F01N 13/1805 60/311 |
| 2011/0148096 A1 * | 6/2011 | Engle | G01K 1/14 285/93 |
| 2014/0131995 A1 * | 5/2014 | Hawkins | F16L 37/08 285/93 |
| 2014/0260564 A1 | 9/2014 | Beemer et al. | |
| 2014/0366975 A1 * | 12/2014 | Allison | F16L 57/06 138/36 |
| 2015/0345675 A1 * | 12/2015 | Diekmeyer | F16L 21/005 285/370 |
| 2016/0305586 A1 * | 10/2016 | Graham | B01L 3/563 |
| 2019/0331267 A1 * | 10/2019 | Warren | F16L 21/04 |

OTHER PUBLICATIONS

[No Author Listed] High-Performance Ceramic Tubes & Rods. CoorsTek. http://www.coorstek.com/english/solutions/products/tubes-rods/, 2 pages [Aug. 27, 2016].

[No Author Listed] Sapphire Tubes & Rods. Saint-Gobain. https://www.crystals.saint-gobain.com/products/sapphire-tubes-rods, 6 pages [2006].

Pugnaire et al., Selecting Pressure Sensor for Advanced Chromatography Systems. DJ Instruments. 2011. http://www.djinstruments.com/stuff/contentmgr/files/0/21a3569a3c65840c685997f010c16360/pdf/chromatography_paper.pdf, 5 pages.

Supplementary European Search Report in European Appln. No. EP 17882083, dated Jun. 30, 2020, 4 pages.

Japanese Office Action in JP Appln. No. 2019-551510, dated Jan. 22, 2021, 7 pages (with English translation).

* cited by examiner

MULTI-PIECE FLOW THROUGH CONNECTOR

CROSS-REFERENCE TO RELATED APPLICATIONS

This application claims the benefit of priority under 35 U.S.C. § 119(e) of U.S. provisional application Ser. No. 62/433,663, filed Dec. 13, 2016, the disclosure of which is incorporated by reference herein in its entirety.

FIELD

Disclosed embodiments are related to a multi-piece flow through connector.

BACKGROUND

High pressure liquid chromatography and related biochemical fields typically measure process pressure in an uninterrupted flow path with no corners or crevices where material may collect. The flow path is either made from, or is lined with, a material that is inert to the gasses, liquids, and/or other materials being measured. For example, applications such as ion chromatography use an inert flow path lined with tubing materials such as polyether ether ketone (PEEK) or polytetrafluorethylene (PTFE), as well as pressure measurement sensors made with non-metallic inert materials.

SUMMARY

In one embodiment, a multi-piece flow through connector includes a ceramic body including a flow path extending through the ceramic body and at least one non-ceramic body attached to the ceramic body. The at least one non-ceramic body includes one or more attachment features formed therein and the flow path extends through the at least one non-ceramic body.

In another embodiment, a method of manufacturing a multi-piece flow through connector includes: forming a ceramic body including a flow path that extends through the ceramic body; forming at least one non-ceramic body that includes a flow path that extends through the at least one non-ceramic body and one or more attachment features formed therein; and attaching the ceramic body to the at least one non-ceramic body, wherein the flow path of the ceramic body is aligned with the flow path of the at least one non-ceramic body.

In yet another embodiment, a method of forming an uninterrupted flow path through a connector includes: mating a ceramic body including a first flow path extending through the ceramic body with at least one non-ceramic body including one or more attachment features and a second flow path aligned with the first flow path; and attaching a coupling to the one or more attachment features of the at least one non-ceramic body to fluidly couple at least one of a gas and fluid source to the first flow path and press the coupling against a sealing surface of the ceramic body.

In still yet another embodiment, a flow through connector includes a ceramic body and a flow path extending through the ceramic body. At least a portion of the flow path includes a substantially continuous and smooth surface. The connector also includes a pressure window formed in the ceramic body. The pressure window deforms due to pressure in the flow path. Additionally, a pressure sensor is disposed in the pressure window.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

As noted above, the industry standard for measuring process pressure is a metal flow-through connection including a non-metallic inert material insert. The inventors have recognized that in some application it may be desirable to form a connection with the desired flow-through path lined with an inert material without the need for a separate non-metallic insert. However, machining an entire connection from an inert ceramic material such as zirconia, quartz, hot isostatically pressed tetragonal zirconia polycrystal (HIP TZP), tetragonal zirconia polycrystal, silicon, and alumina ($Al_2O_3$) is cost prohibitive. Specifically, ceramics are primarily machined by grinding, which makes forming complex shapes such as internal screw threads impractical. Furthermore, achieving optimal thread tolerances is also difficult and expensive.

In view of the above, the inventors have recognized the benefits associated with a multi-piece flow-through connector that includes a ceramic body with a flow path extending through the ceramic body and at least one separate non-ceramic body attached to the ceramic body. The non-ceramic body may include the desired attachment features, such as threads, for connecting the flow-through connector to a fluid or gas source. Thus, the multi-piece connector may include a flow path formed in the inert material of the ceramic body while the attachment features are formed in the non-ceramic body which is made from a material, such as a metal or plastic, which may be easily machined, cast, or molded. In addition to including an inert flow path, in some embodiments, a ceramic body including a flow path may also include one or more pressure sensors capable of measuring the pressure of a liquid or gas contained within the flow path.

The multi-piece flow-through connectors described herein may provide multiple benefits. These benefits may include easier and cheaper manufacturing of a connector since the more difficult to form connection features may be formed in more easily formed and machined materials such as metal and plastic.

The separate ceramic and non-ceramic bodies of a multi-piece connector may be attached to each other in any appropriate fashion. For example, depending on the particular embodiment, the bodies may be attached to one another using threaded connections, separate threaded fasteners, latches, clasps, clips, flanges, mechanically interlocking parts, slide fittings, clamps, snap-fits, brazed joints, and/or any other feature or method capable of maintaining the bodies in a desired position and/or orientation relative to one another during use. In some embodiments, the separate ceramic and non-ceramic bodies may be removably attached.

Depending on the particular embodiment, any number of different types of attachment features may be used for connecting a source of fluid or gas to a multi-piece flow through connector. Appropriate types of attachment features include, but are not limited to, a threaded connection, mechanically interlocking features, an interference fit, clamping, or any other appropriate type of connection as the disclosure is not so limited.

A ceramic body may be made out of any appropriate inert ceramic material for a particular application. For example, depending on the particular embodiment, appropriate corrosion resistant materials may include, but are not limited to, zirconia, quartz, hot isostatically pressed tetragonal zirconia polycrystal (HIP TZP), tetragonal zirconia polycrystal, silicon, alumina ($Al_2O_3$ and also sometimes referred to as sapphire), as well as combinations of the forgoing. In some applications, such as ion chromatography, a flow path through a ceramic component may be exposed to highly corrosive and/or reactive materials. Accordingly, in some applications, it may be beneficial for the selected ceramic material to exhibit a relatively high corrosion resistance to prevent damage to the flow path and/or ceramic body. While any of the above noted ceramic materials may be used, in one such embodiment, the ceramic body may be made out of alumina due to its enhanced corrosion resistance as compared to other ceramic materials the various components may be made from. Of course, it should be understood that the ceramic body may be made out any appropriate material compatible with a desired process as the disclosure is not so limited.

To help with the manufacturing process, a ceramic body may be formed by using molding and/or machining of a "green," or unfired ceramic body. Machining may include milling, grinding, and/or cutting features into the green ceramic body. After formation of the desired structural features, the green ceramic body may be fired to form a final ceramic body for use in a connector. Due to shrinkage during the firing process, manufacturing a thicker ceramic body may result in a less uniform cross-section and flow path. Therefore, as described further below, in some embodiments, it may be desirable to form the green part with thinner walls with a relatively uniform thickness along a length of the part to reduce variations in dimensions due to part shrinkage during firing. While it may be possible to fire a final shape ceramic body, it should be understood that embodiments in which at least some machining of the ceramic body is conducted after firing are also contemplated as well.

The above embodiment results in a polycrystalline component made from sintered ceramic powder. However, the disclosure is not limited to only the use of polycrystalline materials. For example, and without wishing to be bound by theory, grain boundaries within a material may act as defects that lower the overall corrosion resistance of a component. Accordingly, in some embodiments, it may be desirable for one or more components of a flow through connector, such as a ceramic component including a flow path formed there through, to be made out of a single crystal material to increase the corrosion resistance of the component. In such an embodiment, a component may be machined from a single crystal material and then assembled with the other components for forming a desired flow through connector. In one specific embodiment, a component may be made out of single crystal alumina, sometimes referred to as sapphire, due to its relatively high corrosion resistance as compared to other materials. However, other appropriate single crystal materials including, but not limited to, single crystal zirconia, quartz, silicon, and/or any other appropriate single crystal material may be used as the disclosure is not so limited.

In view of the above, it should be understood that the various components described herein may be made from either single crystal and/or polycrystalline materials as the disclosure is not limited in this fashion.

A non-ceramic body used in the multi-piece connectors described herein may be formed using any appropriate manufacturing method and/or any appropriate material. Appropriate manufacturing methods include, but are not limited to, casting, injection molding, vacuum molding, machining, or any other appropriate manufacturing method as the disclosure is not so limited. Additionally, appropriate materials may include, but are not limited to: metals such as stainless steel, titanium, and cast zinc; plastics such as polytetrafluoroethylene (PTFE), polyether ether ketone (PEEK), or any other appropriate material.

In addition to fluidly coupling a fluid or gas source to a multi-piece flow through connector, a connector may also include one or more types of seals to provide a sealed connection to the fluid or gas source. Appropriate seals may include, but are not limited to, a ferrule and corresponding conical sealing surface, push-fit fittings, flange fittings, crimped fittings, or any other appropriate type of seal capable of sealing a tube, pipe, capillary, or other coupling capable of fluidly coupling a fluid or gas source to the connector as the disclosure is not so limited.

Since the seals within a multi-piece flow-through connector may come into contact with the fluid and/or gas flowing through the connector, in some embodiments, it may be desirable to form the various portions of a seal from materials that are inert to the fluid and/or gas. Appropriate materials may include combinations of parts formed using: ceramics such as zirconia, quarts, hot isostatically pressed tetragonal zirconia polycrystal (HIP TZP), tetragonal zirconia polycrystal, silicon, alumina ($Al_2O_3$); polymers such as polytetrafluoroethylene (PTFE), polyether ether ketone (PEEK), and/or any other appropriate material capable of forming at least a portion of a seal while being compatible with the process the connector is associated with. For example, a conical sealing surface may be formed from a ceramic material and a corresponding plastic ferrule may be compressed against the conical sealing surface to form a seal there between.

Typical pressure sensing arrangements may include a tap, i.e. a bore hole, along a length of the flow path through a connector. However, the inclusion of such a structure increases the dead volume present in the connector, and may trap material in the flow path. Further, in some applications there may be a limited amount of material available for a test such as in ion chromatography. In such cases, a lower amount of unused or dead space in a flow-through path may beneficially reduce the minimum volume of material capable of being used during operation. Accordingly, in some embodiments, a flow path through a ceramic body may have a substantially continuous surface such that little to no dead volume exists along the length of the flow path. Additionally, to help prevent the introduction of disturbances and dead volume to the flow of material through a connector, the surface of at least a portion of, and in some instances the entire length of, a flow path through the ceramic body of a connector may be constructed and arranged to form a continuous surface with one or more selectively connectable flow paths the flow path through the connector is connected to. For example, a flow path through a ceramic body of a connector may have no corners, crevices, sharp edges, taps, discontinuities, and/or any changes in direction along its length. Thus, the surface of the flow path may be a smooth continuous surface. Numerous benefits may be associated with such an arrangement. For example, such a construction may provide more consistent and uniform flow in the flow path, little to no dead volume in the flow path, and lower unused volume in the flow path.

To reduce the presence of dead volume and flow disruptions through a connector, it may be desirable, in some embodiments, to provide a smooth continuous transition between a flow path through a connector and the one or more selectively connectable flow paths, i.e. a separate tube or channel, that is connected to the flow path through the connector. In one such embodiment, at least a portion of the flow path through a connector may have a substantially equal diameter, or other appropriate transverse dimension, as the inner diameter, or transverse dimension, of an associated selectively connectable flow path. Thus, the inner surfaces of the associated flow paths may form a smooth continuous surface without any abrupt transitions, corners, or other disruptions along a length of the connector. For example, a flow path through a connector may have a substantially equal diameter to the inner surface of a connected tube, such that when the tube is connected to the ceramic body an inner surface of the flow path of the connector and an inner surface of the tube may be positioned adjacent to one another such that they form a smooth continuous transition between the flow paths with no discontinuities, sharp corners, protrusions, or crevices that may form a dead volume or otherwise disrupt flow. While in some embodiments a flow path through a connector may have a substantially equal diameter to that of an associated selectively connectable flow path, any suitable arrangement may be used including flow paths with different diameters as well as transitions that are discontinuous and/or that are not smooth as the disclosure is not so limited.

As noted above, in some embodiments, an inner surface of a flow path of a connector may transition smoothly to the flow path in the ceramic body, such that a smooth continuous surface between the two flow paths may be formed in the connected configuration. However, it should be noted that the current disclosure is not limited to only the the previously described embodiment including substantially the same inner diameters for the different flow paths. For example, in some embodiments, a flow path through a connector and one or more selectively connected flow paths may have different diameters, but may still have a smooth continuous transition between the different flow paths such that there are no abrupt transitions, corners, or other discontinuities that may cause a dead volume or disrupt flow within the connector. For instance, a flow path of a connector may include a transition region that changes from a first diameter to a second diameter that matches a corresponding diameter of the one or more selectively connectable flow paths which may again provide a smooth continuous transition along the overall flow path through the connector.

In some instances, the amount of material available for performing a desired test may be limited by difficulty to produce or expense. In these cases, a small volume flow path may be beneficial to allow certain tests like ion chromatography to be performed with low quantities of available testing material. Accordingly, in some embodiments, in addition to the above described embodiments, a flow path through a connector may also have a small volume to aid in the processing of relatively small sample sizes. For example, in some embodiments, the volume of a flow path through a connector may be greater than or equal to 1 μL, 5 μL, 10 μL, or any other appropriate volume. Correspondingly, the volume of the flow path through the connector may be less than or equal to 25 μL, 20 μL, 15 μL, or any other appropriate volume. Combinations of the above are contemplated including, for example, a volume of the flow path through the connector between or equal to 1 μL and 25 μL. However, volumes both greater than and less than those noted above as well as different combinations of the noted ranges are also contemplated as the disclosure is not so limited.

Turning now to the figures, several nonlimiting embodiments are described in further detail. However, it should be understood that the current disclosure is not limited to only these specific embodiments. Instead, the various features of the different embodiments may be used either individually and/or in any appropriate combination as the disclosure is not so limited.

For the sake of clarity, unless stated otherwise, for the purposes of the current description, when describing the various components herein, an outwardly oriented direction may correspond to a direction oriented away from a center of a corresponding ceramic body and an inward direction may correspond to a direction oriented toward the center of the ceramic body.

FIGS. 1-6 depict one embodiment of a multi-piece flow-through connector. In the figures, the flow-through connector includes a cylindrical ceramic body 1 and two cylindrical non-ceramic bodies 5 disposed on the two opposing ends of the ceramic body 1. The ceramic body and the non-ceramic bodies may include opposing flat surfaces that are placed into contact with one another when assembled. As described further below, the bodies are held together using corresponding clips 7 engaged with slots 9 and a flow path 11 extending through the connector. Additionally, while cylindrical structures have been depicted, it should be understood that any appropriate shape may be used for these components as the disclosure is not limited to any particular shape of the components.

Figure 1:
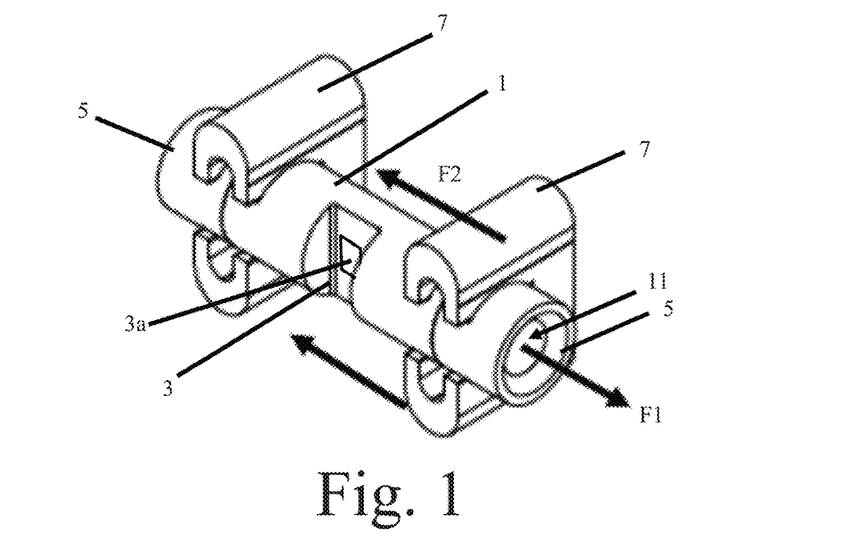
FIG. 1 is a front right side perspective view of a connector including a ceramic body and two non-ceramic bodies attached to opposing ends of the ceramic body according to one embodiment.
Figure 2:
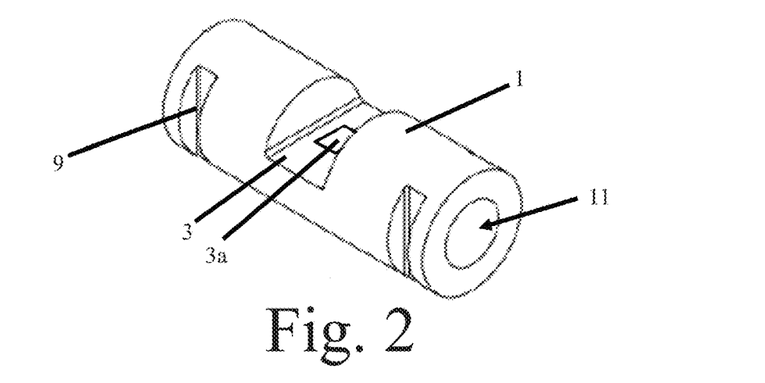
FIG. 2 is a bottom right side perspective view of the ceramic body of FIG. 1.
Figure 3:
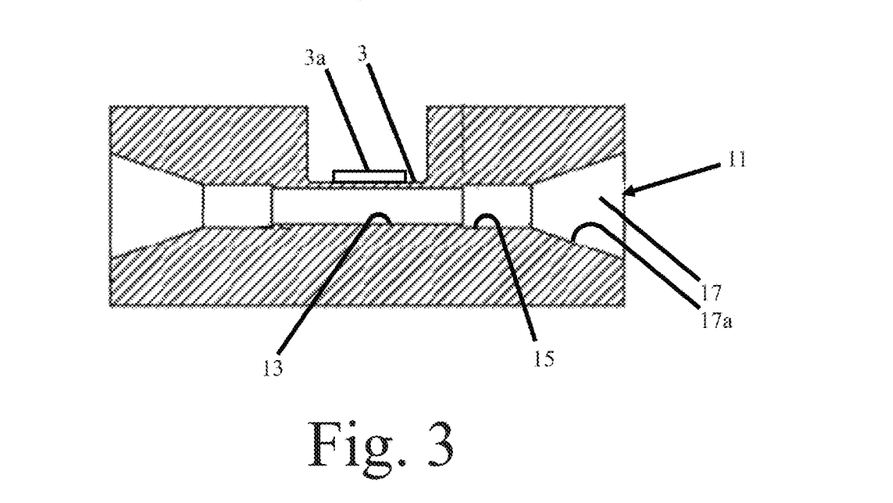
FIG. 3 is a cross-sectional view of a ceramic body.
Figure 4:
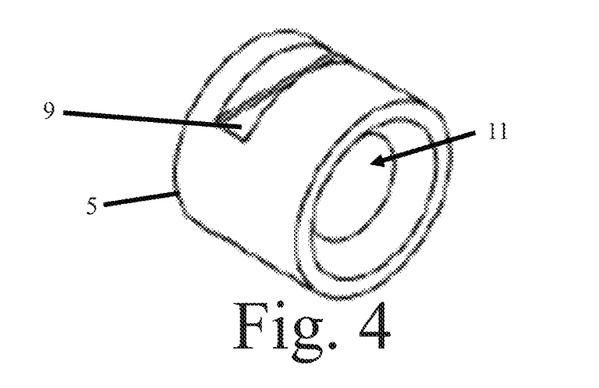
FIG. 4 is a front right side perspective view of one of the non-ceramic bodies of FIG. 1.

In the depicted embodiment, a flow path 11 may extend through the ceramic body 1 and opposing non-ceramic bodies 5 such that the separate flow paths formed in each body are aligned with one another. In the depicted embodiment, the flow path corresponds to a through hole passing axially through each of the bodies. In some embodiments, a portion of the flow path located within the ceramic body may have a uniform cross-section in a first middle portion 13 of the ceramic body. In this embodiment, the middle portion of the flow path may be a substantially smooth continuous surface such that no corners, crevices, or other disruptions are present along the length of the flow path that may cause dead volume, disrupt flow, or collect material. Extending out from either side of this middle portion of the flow path, the flow path may then widen towards either end of the ceramic body to accommodate the presence of tube and seals in a second portion 15 and third portion 17 of the flow path respectively. Specifically, as best seen in FIG. 3, the flow path 11 within the ceramic body includes a uniform first diameter that extends along a length of the ceramic body 1 in a first middle portion 13 of the flow path 11. The flow path 11 then widens to a larger uniform second diameter in the second portion 15 prior to widening out to form a conical sealing surface at the third portion 17 of the flow path within the ceramic body 1. Again, the portion of the flow path that extends through the ceramic body 1 may be in fluid communication with a portion of the flow path 11 located in the non-ceramic bodies. Further, the portion of the flow path located within the non-ceramic bodies may be axially aligned with the portion of the flow path located within the ceramic body. For example, in some embodiments, the flow path may be substantially straight. However, embodiments in which a flow path is curved and/or includes bends are also contemplated.

As noted previously, to reduce a dead volume and flow disruption within a connector, it may be desirable to provide a smooth continuous flow path through a connector. Thus, in some embodiments, the one or more tubes, channels, or other appropriate selectively connectible flow paths, not depicted, may be connected to the first portion of flow path 13 through the connector. Again, this is the portion of the flow path through the connector that is exposed to a flow of material through the connector. The one or more selectively connectible flow paths may be sized and shaped such that when these flow paths are positioned adjacent to one another, the inner surface of the selectively connectible flow path and the middle portion of the flow path 13 through the connector form a smooth and continuous surface across their interface. For example, an inner diameter, or transverse dimension, of the connectible flow path may be substantially the same as the inner diameter, or transverse dimension, of the first portion of the flow path exposed to the material flowing there through. Thus, when abutted against each other, there is no transition in shape and/or size of the flow path resulting in a smooth continuous flow path. In addition to the smooth continuous transition across this interface, in some embodiments, the diameter of the flow path through the connector and the one or more selectively connectible flow paths may be substantially constant within the length of the connector. However, embodiments in which non-constant diameters are used are also contemplated. Again the above described embodiments, may help to reduce flow disruptions and the creation of dead space within a connector.

In operation, portions of a ceramic body 1 may deform due to the presence of a pressurized fluid and/or gas within the flow path 11. This deformation of the ceramic body 1 may be used to sense the pressure within the flow path 11. Specifically, the pressure within the flow path 11 may be measured by measuring a strain or deformation within a portion of the flow path 11 having known physical characteristics and correlating the measured strain or deformation with a pressure. For example, a pressure sensor attached to a deformable portion of a ceramic body 1 may include a strain gauge, a linear voltage displacement transducer, optics and/or laser based distance measurement techniques, and any other appropriate way of measuring deformation of a surface of the ceramic body. A signal from the pressure sensor may be output to an associated computing device for determining a pressure within the connector.

In view of the above, in some embodiments, a ceramic body 1 may include a pressure-sensing window 3 corresponding to a section of the ceramic body 1 that is thinner than surrounding portions of the ceramic body 1. The window may either be curved, flat, or have any other appropriate shape to accommodate the presence of a pressure sensor 3a, such as a strain gauge, disposed within the pressure-sensing window or otherwise attached to a surface of the ceramic body 1. The depicted window may be located along a portion of the length of the flow path 11. Further, as best seen in FIG. 3, the pressure-sensing window 3 may extend along at least a portion of the length of a middle portion 13, or other appropriate portion, of the flow path 11 within a ceramic body 1. Additionally, this portion of the flow path may have a uniform diameter to facilitate applying a constant force to the window along its length from the pressurized fluid and/or gas within the connector. In the depicted embodiment, the pressure sensing window 3 does not extend into the flow path and thus does not disrupt the uniform diameter of the flow path. This may help reduce the presence of dead volume, flow disruption, and/or the collection of material within the flow path during operation. This is in contrast to more typical pressure sensing systems where a tap, or other feature, may open onto, or physically intrude into, the flow path itself.

As noted previously, any number of ways for maintaining the positioning and orientation of different bodies within a multi-part flow through connector may be used. However, in the embodiment depicted in FIGS. 1, 2, 4, and 6, one or more clips 7 may be used to mate a ceramic body 1 with one or more corresponding non-ceramic bodies 5. Specifically, the clips 7 engage with, and are retained in, corresponding slots 9 formed in the ceramic body and non-ceramic bodies to maintain the ceramic body and non-ceramic bodies in a desired position and orientation relative to each other. The slots may correspond to a pair of slots formed on opposing sides of each of the bodies as depicted in the figures. Further, slots formed in the bodies may be adjacent to each other when the bodies are mated, or otherwise attached, to each other. As illustrated in the figures, the slots may be rectangular cut-outs formed on portions of the ceramic body and associated portions of the non-ceramic bodies. The slots may also be oriented substantially perpendicular to a direction of the flow path passing through the bodies. While particular shapes, positions, and orientations of slots have been depicted in the figures, it should be understood that the slots may have any appropriate shapes and/or size and may be located on different portions of the bodies as the disclosure is not so limited.

Figure 6:
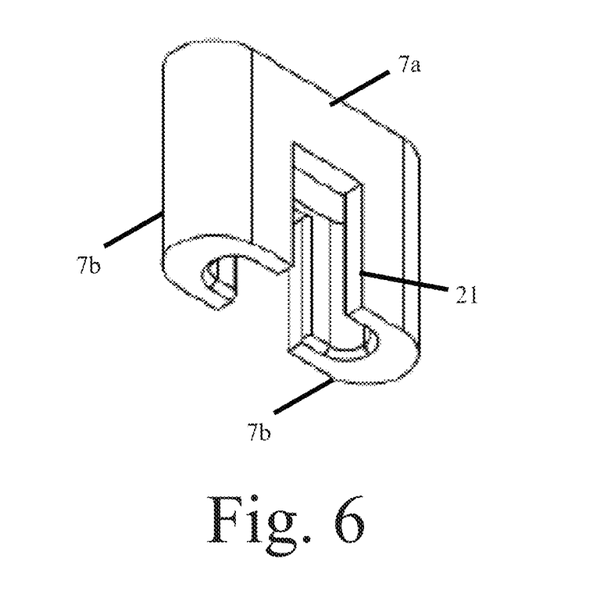
FIG. 6 is a bottom left side perspective view of the clip of FIG. 1.

FIG. 6 depicts a close up view of one embodiment of a clip 7 that may be used to hold a ceramic body 1 and non-ceramic body together. In the depicted embodiment, the clip has a U, or similarly, shaped profile with two legs 7b extending outwards from opposing ends of a backspan 7a. The legs may include a pair of opposing ridges 21 that extend along a length of an inwardly oriented surface of the legs that faces the ceramic and non-ceramic bodies when assembled thereto. The ridges may be sized and shaped such that they engage the slots 9 formed on a non-ceramic body and the associated portion of the ceramic body 1 as described above to maintain the bodies engaged with one another. Of course it should be understood that in other embodiments the ceramic body and non-ceramic bodies may be connected using other methods including, but not limited to, separate threaded fasteners, latches, clasps, flanges, mechanically interlocking parts, slide fittings, clamps, snap-fits, brazed joints, and/or any other feature or method capable of maintaining the bodies in a desired position and/or orientation relative to one another during use.

To form a fluid and/or gas tight seal between a ceramic body 1 and a portion of a flow path 11 passing through the ceramic body 1, the bodies may include one or more features to form a seal. In the embodiment depicted in FIGS. 1-3, the ceramic body 1 includes sealing surfaces 17*a* formed on opposing end portions of the ceramic body 1. The sealing surfaces in this embodiment are conical surfaces formed on opposing ends of the ceramic body 1 that extend inwards towards a middle of the ceramic body. In such an embodiment, corresponding ferrules (not shown) are connected with a tube inserted through the non-ceramic body 5 and into engagement with the ceramic body. When fully assembled, the tube extends into the second portion of the flow path 15 adjacent to a uniform diameter middle portion of the flow path 13. At the same time, the ferrules are pressed against the sealing surfaces to form a seal with the ceramic body.

Figure 5:
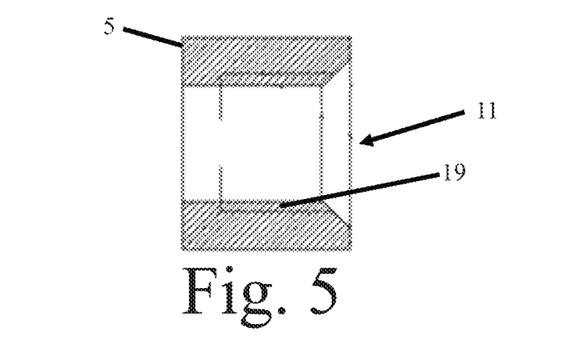
FIG. 5 is a cross-sectional view of a non-ceramic body.

To hold an associated tube and seal in place, as well as to apply a compressive force to the seal, in some embodiments, one or more non-ceramic bodies associated with a ceramic body may include attachment features such as threads 19 formed on an internal surface of the non-ceramic bodies, see FIG. 5 and may also include an outer tapered opening toward on outer surface of the non-ceramic body located opposite the ceramic body when assembled. The threads 19 may be machined or molded, and may have sizes ranging from 1-72 to ¼-28, or any other appropriate size including sizes both larger and smaller than those noted above as the disclosure is not so limited. In one embodiment, the outer portion of the non-ceramic body expands outward to help facilitate the engagement of a ferrule or other threaded connection with the non-ceramic body. In such an embodiment, the ferrule, or other appropriate component, such as a nut, may be threaded into the non-ceramic body. Accordingly, the ferrule or nut may be used to compress a corresponding conical surface of the ferrule against the conical sealing surface 17*a* of the ceramic body. This compressive force of the ferrule against the sealing surface forms a fluid-tight seal between the ceramic body and the ferrule. In the depicted embodiment, the threads are located on a portion of an internal surface of the through hole forming the flow path through the non-ceramic body. However, it should be understood that the threads, or other attachment feature, may be located on an external surface of the non-ceramic body as well.

It is notable that there is no force on the clip 7 depicted in the embodiment of FIGS. 1-6 until after the ferrule and/or nut are threaded into the non-ceramic body. When connected, the threads of the ferrule and/or nut exert a force against the threads of the non-ceramic body 5 such that the non-ceramic body 5 is pushed outward by a force F1 from the ceramic body 1. This force is counteracted by the clip 7 which applies a force F2 in an opposing direction to hold the non-ceramic and ceramic bodies together during use.

Figure 7:
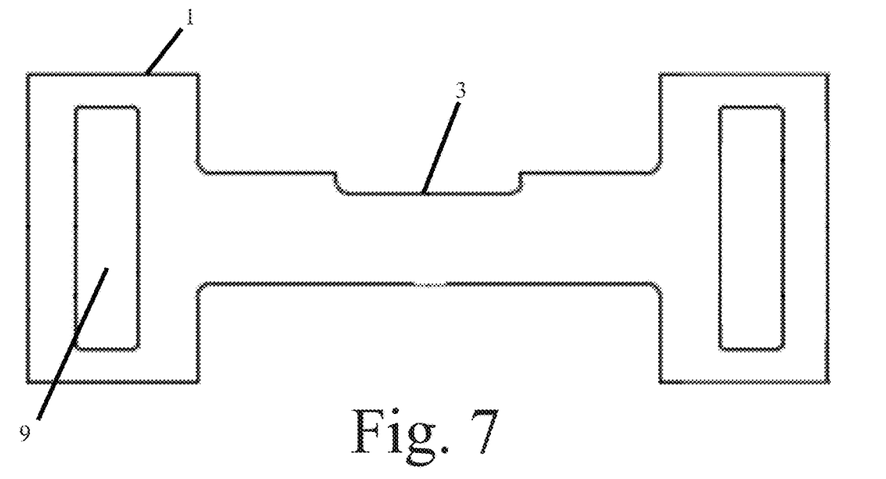
FIG. 7 is a top plan view of a ceramic body including substantially uniform wall thicknesses according to one embodiment.
Figure 8:
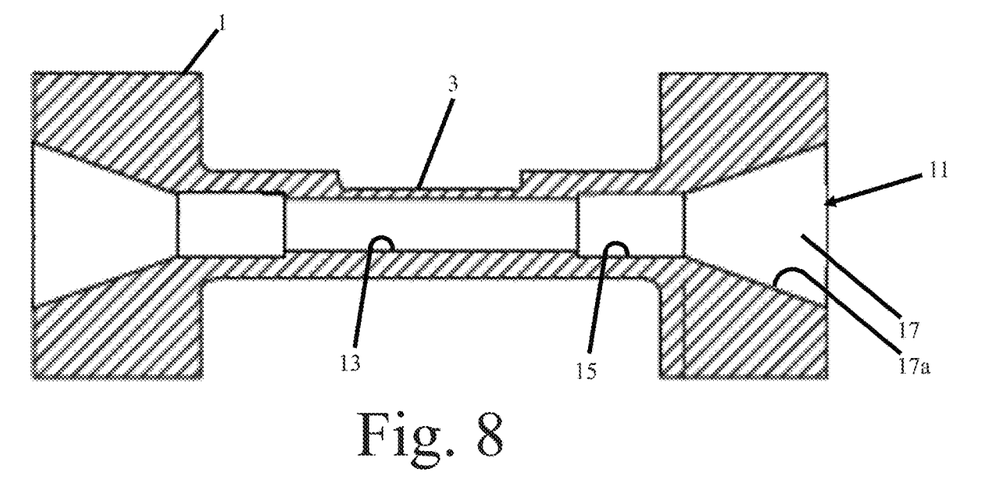
FIG. 8 is a cross-sectional view of a ceramic body including substantially uniform wall thicknesses.

FIGS. 7 and 8 illustrate another embodiment of a ceramic body 1 of a multi-piece flow-through connector. Similar to the prior embodiment the ceramic body includes a pressure-sensing window 3 and two pairs of slots formed on opposing sides and on the two opposing end portions of the ceramic body. The ceramic body also has a flow path extending therethrough as previously described and may be associated with one or more non-ceramic bodies as well. However, as noted previously, a ceramic body having larger non-uniform thicknesses along its length may exhibit larger dimensional variations in the final ceramic body after firing. For example, thicker sections tend to shrink more than thinner sections during firing. Additionally, less shrinkage reduces the likelihood of non-uniformities developing along the flow path, which may improve pressure sensing capabilities. Accordingly, in some embodiments, to help reduce dimensional variations in a ceramic body, the ceramic body may have a substantially uniform thickness along its length. For example, since the flow path diameter varies along a length of the ceramic body, the ceramic body may have a first external diameter along the length of a first portion of the ceramic body and a second external diameter larger than the first external diameter along the length of a second portion of the ceramic body. For example, the middle portion of a ceramic body may have a smaller external diameter than the opposing ends of the ceramic body connected to the non-ceramic bodies.

Figure 9:
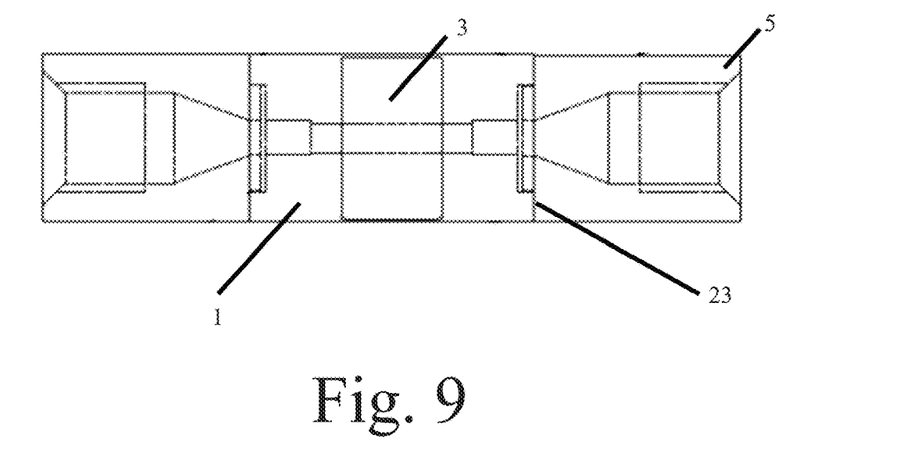
FIG. 9 is a top plan view of a connector including a ceramic body and two non-ceramic bodies attached to opposing ends of the ceramic body using brazed joints according to one embodiment.

FIG. 9 shows another embodiment of a multi-piece flow through connector. Again, similar to the prior embodiments, the connector includes a ceramic body 1 and two opposing non-ceramic bodies 5. However, instead of using clips to attach the different bodies, the ceramic body and non-ceramic bodies are attached using a brazed joint 23. To form the brazed joint, the surfaces of the ceramic body facing the associated surfaces of the non-ceramic bodies may be at least partially metallized, or otherwise have metal applied to the surfaces. These metalized surfaces may then be brazed to the corresponding surfaces of the non-ceramic bodies. The brazed joint may be constructed to support the forces applied when a connector, such as a ferrule, is threaded onto the non-ceramic bodies.

Figure 10:
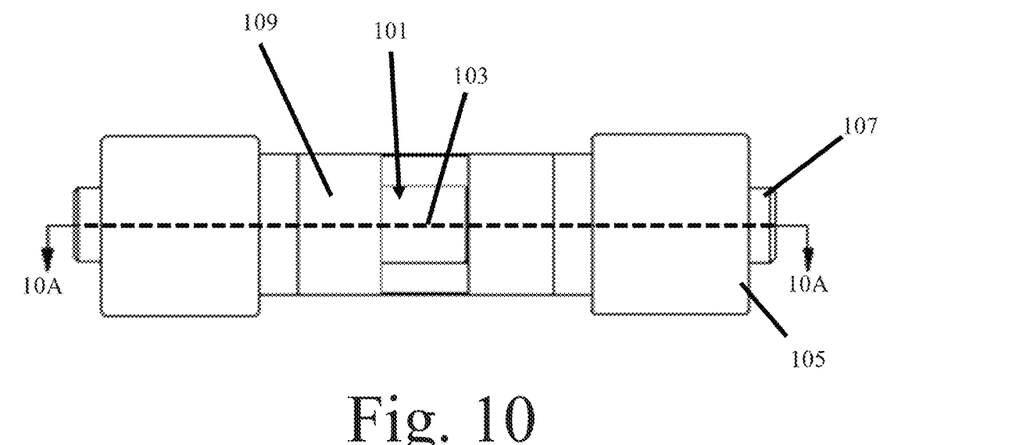
FIG. 10 is a top plan view of a ceramic body disposed within a non-ceramic body according to one embodiment.
Figure 10A:
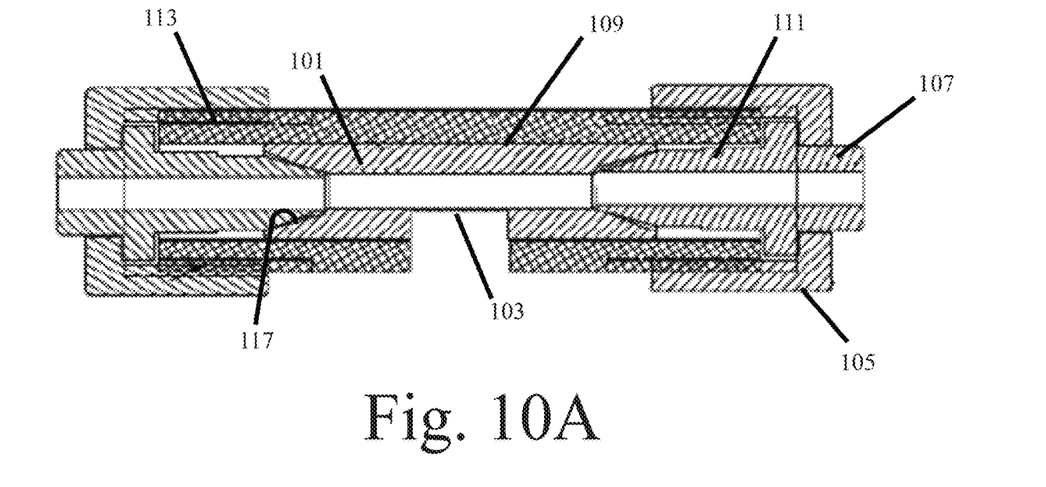
FIG. 10A is a cross-sectional view of the ceramic and non-ceramic bodies of FIG. 10.

FIGS. 10 and 10A show another embodiment of a multi-piece flow through connector. In the depicted embodiment, a cylindrical ceramic body 101 is disposed within an outer non-ceramic body 109 in the shape of a tube. The ceramic body and non-ceramic body may be appropriately sized and shaped to form a slip fit or an interference fit between the ceramic body 101 and the tube 109. In such an embodiment, the outer non-ceramic body 109 may also include a cut-out aligned with a pressure sensing window 103 formed in the ceramic body to permit the use of a pressure sensor as previously described. Similar to the prior embodiments, the ceramic body may include one or more conical sealing surfaces 117. To permit a corresponding fluid or gas source to be attached to the connector, the opposing end portions of the tube may include one or more attachment features such as interior and/or exterior threads 113. These threads may be engaged by corresponding threads formed on any appropriate connector such as a threaded cap 105, nut, or other threaded component that is used to retain a tube 107 or other fluid coupling engaged with the connector. The cap may have an opening corresponding to a through hole to permit the passage of the associated tube 107 used to couple the connector to the fluid or gas source. Similar to the above embodiments, to form a fluid-tight seal with the ceramic body, a coupling, such as ferrule 111, may be inserted into one, or both, ends of the ceramic body and outer non-ceramic body 109. The ferrule is then compressed against the conical sealing surface by the threaded cap 105 that is threaded onto and engaged with the threads formed on the tube. However, other appropriate attachment feature may also be used. Due to the use of ferrules and caps on opposing sides of the ceramic body and non-ceramic body, the ceramic body may be compressed between the two corresponding ferrules and caps in the assembled condition.

In the embodiment depicted in FIG. 10A, the inner surface of the tube 107 and flow path in the ceramic body 101 may have substantially equal diameters, such that a smooth continuous surface is formed across an interface between the flow path through the ceramic body and the inner surface of the tube 107. Such an arrangement may reduce, or eliminate, the presence of discontinuities, sharp edges, turns, protrusions, and/or crevices that may increase a dead volume or disrupt flow through the ceramic body 101. To properly align the inner surface of the tube 107 and the flow path, the coupling 111 (shown here as a ferrule), may be arranged to center the axes of the flow path in the ceramic body and the inner surface of the tube 107 as it is compressed against the ceramic body 101 to create a fluid-tight seal. In the depicted embodiment, this centering is accomplished by the conical sealing surface 117, which centers the coupling 111 about the axis of the flow path such that a substantially smooth, continuous, and constant diameter surface is formed across the interface between the inner surface of the tube 107 and flow path.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A multi-piece flow through connector comprising:
   a ceramic body including a flow path extending through the ceramic body, wherein the ceramic body includes a pressure window formed in the ceramic body and wherein a pressure sensor is disposed in the pressure window; and
   at least one non-ceramic body attached to the ceramic body, wherein the at least one non-ceramic body includes one or more attachment features formed therein, and wherein the flow path extends through the at least one non-ceramic body.

2. The multi-piece flow through connector of claim 1, further comprising a pressure sensor associated with a portion of the ceramic body that deforms due to pressure within the flow path.

3. The multi-piece flow through connector of claim 1, wherein the one or more attachment features comprise at least one of a threaded connection, mechanically interlocking features, and an interference fit.

4. The multi-piece flow through connector of claim 1, wherein the ceramic body includes at least one slot formed therein and the at least one non-ceramic body includes at least one slot formed therein.

5. The multi-piece flow through connector of claim 1, further comprising at least one clip engaged with at least one slot formed in the ceramic body and at least one slot formed in the at least one non-ceramic body to maintain an orientation and position of the ceramic body relative to the at least one non-ceramic body.

6. The multi-piece flow through connector of claim 5, wherein the at least one clip comprises a backspan and two legs extending out from opposing ends of the backspan, wherein a pair of ridges formed on each leg engage corresponding slots formed in the ceramic body and the at least one non-ceramic body.

7. A flow through connector comprising:
   a ceramic body;
   a flow path extending through the ceramic body, and wherein at least a portion of the flow path includes a substantially continuous and smooth surface;
   a pressure window formed in the ceramic body, wherein the pressure window deforms due to pressure in the flow path; and
   a pressure sensor disposed in the pressure window.

* * * * *